United States Patent [19]
Misawa

[11] Patent Number: 5,198,892
[45] Date of Patent: Mar. 30, 1993

[54] IMAGE INPUT DEVICE FOR GENERATING A VIDEO SIGNAL FOR AN IMAGE REPRODUCTION APPARATUS

[75] Inventor: Takeshi Misawa, Tokyo, Japan

[73] Assignee: Fuji Photo Film Co., Ltd., Kanagawa, Japan

[21] Appl. No.: 659,166

[22] Filed: Feb. 22, 1991

[30] Foreign Application Priority Data

Feb. 22, 1990 [JP] Japan .................................. 2-39826

[51] Int. Cl.⁵ ............................................. H04N 9/04
[52] U.S. Cl. ...................................... 358/41; 358/80; 358/22
[58] Field of Search .................... 358/41, 80, 75, 22, 358/27, 29, 183, 87

[56] References Cited

U.S. PATENT DOCUMENTS

| | | | |
|---|---|---|---|
| 4,613,906 | 9/1986 | Tanaka et al. | 358/183 |
| 4,635,101 | 1/1987 | Nakayama | 358/21 R |
| 4,734,763 | 3/1988 | Urabe et al. | 358/80 |
| 4,829,371 | 5/1989 | Hiramatsu et al. | 358/80 |

*Primary Examiner*—Michael T. Razavi
*Assistant Examiner*—Tuan V. Ho

[57] ABSTRACT

An image input device for imaging an object includes a process circuit which has a negative/positive inversion function for forming a luminance signal and color difference signals to reproduce a negative image from pixel signals corresponding to the object or for forming the luminance signal and the color difference signals to reproduce a positive image from the pixel signals corresponding to the object. An image of the object may be reproduced in the image input device as a video signal in a blue-back mode by a blue-back circuit. The blue-back circuit processes the luminance signal and the color difference signals so that a portion of the object is forcibly colored blue or a family color when the level of the luminance signal outputted from the process circuit is within a predetermined range. Also, the blue-back circuit processes the luminance signal and the color difference signals so that a high brightness portion of the object is forcibly set to a white level or a family color when the level of the luminance signal outputted from the process circuit exceeds the predetermined range. As a result, the image object may be reproduced in the blue-back mode so that an illegible object can be displayed as a legible document.

21 Claims, 5 Drawing Sheets

IMAGE INPUT DEVICE FOR GENERATING A VIDEO SIGNAL FOR AN IMAGE REPRODUCTION APPARATUS

TECHNICAL FIELD OF THE INVENTION

The present invention relates to an image input device which electrically picks up a desired object in a color mode and generates a video signal to be supplied to an image reproduction apparatus, such as a monitor television, or an image recording apparatus for recording the image on an appropriate recording medium.

DESCRIPTION OF THE RELATED ART

Conventional image input devices include a camera mechanism for receiving an optical image of an object by a color solid state image pickup device, and a signal processor for generating a video signal based on a standard television system, e.g., an NTSC system, by signal processing pixel signals derived from the color solid state image pickup device. Such conventional image input devices are capable of picking up both a motion picture and a still picture.

To make the image reproduced by the image reproduction apparatus, such as a monitor television for example, easy to see, the conventional image input devices further include the function of a negative/positive inversion to process the video signal so as to invert the color and the function of a color/monochrome conversion to convert a color image to a monochromatic image.

When any of these functions is properly selected and the object is reproduced by the image reproduction apparatus, an illegible object image can be displayed as a legible image. In a case where the object is a negative film and the negative/positive inversion function is selected, an image of the negative film whose color is hard to discriminate can be reproduced as a positive image which is easy to see. In such an original document which is reproduced as a color image, when characters and graphic patterns depicted on the document are illegible, the color/monochromatic conversion function may be selected, and the image is reproduced as a monochromatic image, so that the illegible characters and graphic patterns are legible. If a document containing black characters and graphic patterns in a white background is reproduced in the form of a color image, the reproduction of the document inversion is selected. Then, the image reproduction apparatus reproduces an inversion of the original document image which provides an image that is easy to see.

SUMMARY OF THE INVENTION

An object of the present invention is to provide an image input device and a method having a function which provides an easy-to-see reproduced image of an imaged object.

To achieve the above object, the present invention is directed to an image input device having processing means with a negative/positive inversion function for forming a luminance signal and a color-difference signal to reproduce a negative image by using pixel signals resulting from a color-mode image pickup, or a luminance signal and a color-difference signal to reproduce a positive image.

The image input device comprises blue-back processing means for generating a video signal to reproduce an image of the imaged object in a blue-back mode by processing the luminance signal and the color-difference signals so that a portion of the object image where the level of the luminance signal outputted from the processing means is within a predetermined range, is forcibly colored blue or a family color of the object, and by processing the luminance signal and the color-difference signals so that a high brightness portion of the object image where the level of the luminance signal outputted from the processing means exceeds the predetermined range, is forcibly set to a level of white or a family color of the object. With such an arrangement, a blue-back mode can be selectively used.

In one embodiment of the invention, a blue-back circuit is provided which functions in the following way. When the blue-back mode is selected, the luminance signal (Y) outputted from the processing means is phase inverted. The red signal component is removed from the red color-difference signal (R - Y). The blue color-difference signal (B - Y) is fixed at a preset level for setting a blue color signal component. A video signal that can be reproduced by an image reproduction apparatus, such as a monitor television for example, is formed by using the luminance signal and the processed color-difference signal. When the video signal is supplied to the image reproduction apparatus or the image recording apparatus, a known slice circuit for the luminance signal, which is contained in the apparatus, colors a high luminous intensity or brightness portion of the image white, and a low brightness portion of the image blue or a family color. In this way, the image on the original document can be displayed in the blue-back mode.

To display a document which contains black characters and graphic patterns in a white background (more exactly, an object such that the brightness in the background is higher than the brightness in the foreground desired to be colored white e.g., characters and graphic patterns) in the blue-back mode when reproduced, all a user has to do is to set the processing means in a positive color image pickup mode and to set the blue-back processing means in a blue-back mode.

To display a document, which contains white characters and graphic patterns in a black background (more exactly, an object such that the brightness desired to be colored white e.g., characters and graphic patterns) in the blue-back mode when reproduced, all a user has to do is to set the processing means in a negative color image pickup mode and to set the blue-back processing means in a blue-back mode.

In another embodiment of the invention, the blue-back processing means may include means for forcibly setting a low brightness portion in the object image to a preset voltage level corresponding to blue or a family color, and for forcibly setting a high brightness portion to a preset voltage level corresponding to white or a family color.

According to the embodiments of the present invention, the image input device and the method can reproduce an image picked up in a color mode to the blue-back mode. As a result, the illegible object or document can be displayed as a legible object or document and the object or document may be reproduced as an easy to see image.

Further scope of applicability of the present invention will become apparent from the detailed description given hereinafter. However, it should be understood that the detailed description and specific examples, while indicating preferred embodiments of the invention, are given by way of illustration only, since various changes and modifications within spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
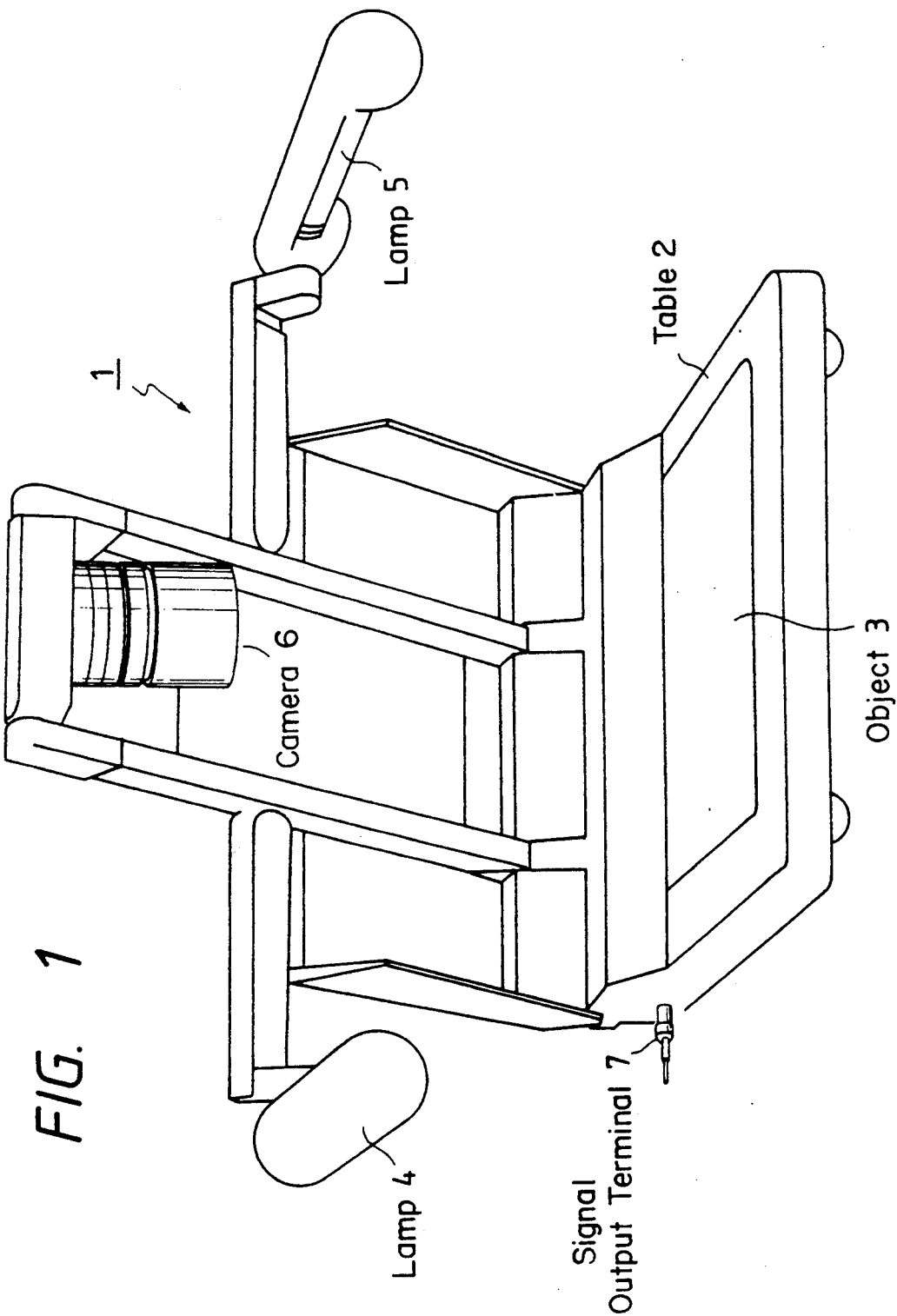
FIG. 1 illustrates an image for an embodiment of the present invention.

A first embodiment of the present invention will be described with reference to FIGS. 1 through 3.

An external structure of an image input device 1 will be described with reference to FIG. 1. Reference numeral 2 designates a table on which a relatively small and thin object, such as an original document or a film after development, is placed. Reference numerals 4 and 5 represent lamps for illuminating an object 3 (an original document in the drawing) placed on the table 2.

Reference numeral 6 designates a camera mechanism for receiving an optical image of the object. The camera is able to pick up a still picture and a motion picture in a color mode. In the structure of the camera, an image pickup device including a color charge coupled type solid state image pickup device or a MOS type color solid state image pickup device is located on the rear side of an image-pickup optical system. The camera mechanism 6 is rotatably supported by an upstanding support on the table 2. As illustrated, when the optical system is directed to face the table 2, the camera 6 picks up the object 3, such as an original document. When the camera 6 is turned so as to direct the optical system aside, the camera 6 picks up the scene.

Reference numeral 7 designates a signal output terminal for outputting a video signal of the NTSC system, which is formed using pixel signals derived from the camera 6 by an internal circuit (not illustrated in FIG. 1). When the output terminal 7 is connected to the input terminal of a video reproduction apparatus or an image recording apparatus, the video signal is fed to the apparatus.

The image input device illustrated in FIG. 1 depicts a state when the device is used. When the device is not used, the device may be folded and easily carried as a trunk.

The internal circuit of the image input device will be described with reference to FIGS. 2 and 3.

An arrangement of the internal circuit will first be described with reference to FIG. 2. An optical image from the object 3, such as an original document for example, is focused on a color image pickup device 11 through an image pickup optical system 60 in the camera mechanism 6. A pixel signal is read out from the image pickup device 11 in synchronism with a scanning timing of a dot-sequence, by a predetermined drive method.

The pixel signal read out of the device 11 is applied through a pre-amplifier 12 to a color separation circuit 13. In the color separation circuit 13, the pixel signal is separated into three pixel signals of red (R), blue (B), and green (G). Then the R, B and G pixel signals are subjected to a white balance adjustment process, and applied to a process circuit 14.

The process circuit 14 includes buffer amplifiers 15a for amplifying the R, G and B pixel signals in a non-inverting mode and buffer amplifiers 15b for amplifying the R, G and B pixel signal in an inverting mode, and switches S1, S2 and S3 for respectively selecting the output signals of the buffer amplifiers 15a and 15b and respectively applying the resultant signals to "γ" correcting circuits 16.

When a user turns the switches S1 to S3 to contacts "a", a non-inverted (positive) color image is reproduced by an image reproducing apparatus. When a user turns the switches to contacts "b", an inverted (negative) color image is reproduced by the image reproducing apparatus.

The color pixel signals outputted from the process circuit 14 are supplied to a matrix circuit 17 which in turn supplies a luminance signal Y, and color-difference signals R - Y and B - Y to a blue-back circuit 18.

The blue-back circuit 18 contains an inverting buffer amplifier 20 for amplifying the luminance signal in an inverting mode and supplies the resultant inverted luminance signal to a contact "b" by a first select switch S11. In the blue-back circuit 18, the luminance signal may directly be supplied to another contact "a" by the first select switch S11. The color-difference signal R - Y may be directly applied to a contact "a" by a second select switch S12. Another contact "b" of the second select switch S12 is grounded through a capacitor C. The color-difference signal B - Y may be directly applied to a contact "a" of a third select switch S13. Another contact "b" of the third select switch S13 is biased by a preset DC voltage Vref. The first to third select switches S11 to S13 are interlocked with each other, and when manually operated by the user are turned to the contacts "a" or "b" in an interlocking manner.

The output signals of the switches S11 to S13 are supplied to an encoder 19. In an encoder 19, the output signals are converted into a video signal Vo for a standard television system, e.g., an NTSC system, which in turn is applied to a signal output terminal 7.

The operation of the circuit thus arranged will be described with reference to FIG. 3.

As already stated, the switches S1 to S3 are provided for the negative/positive inversion. When those switches are simultaneously turned to the contacts "a" by the user, the positive (non-inverted) reproduction image is designated. When the switches are turned to the contacts "b", the negative (inverted) reproduction image is designated.

When the first to third select switches S11 to S13 in the blue-back circuit 18 are turned to the contacts "b", a blue-back display is designated. When the switches are turned to the contacts "a", a normal display is designated.

When the switches S1 to S3 in the process circuit 14 and the switches S11 to S13 in the blue-back circuit 18 are properly combined and switched, four reproduction images may be obtained as illustrated in the following table.

| Switching Modes | Operation Mode |
| --- | --- |
| (1) S1 to S3 to contacts "a" & S11 to S13 to contacts "a" | Normal positive image |
| (2) S1 to S3 to contacts "b" & S11 to S13 to contacts "a" | Negative image |
| (3) S1 to S3 to contacts "a" & S11 to S13 to contacts "b" | Blue-back display of the negative image |
| (4) S1 to S3 to contacts "b" & S11 to S13 to contacts "b" | Blue-back display of the positive image |

Those switching modes and the resultant operation modes will be described in detail.

Switching mode (1)

In the switching mode (1), the switches S1 to S3 are turned to contacts "a" and the switches S11 to S13 are turned to contacts "a". Under this condition, the color signals R, G, and B outputted from the color separation circuit 13 are supplied to the matrix circuit 17 through the non-inverting buffer amplifiers 15a without being inverted. Accordingly a luminance signal Y, and color-difference signals R - Y and B - Y, which are for a positive image, are generated. In the blue-back circuit 18, the signals Y, R - Y, and B - Y are directly supplied through the contacts "a" to the encoder 19. Accordingly, a video signal Vo for reproducing a normal positive image is formed. As a result, normal color image mode is set up as indicated in the table.

Switching mode (2)

In the switching mode (2), the switches S1 to S3 are turned to contacts "b" and the switches S11 to S13 are turned to contacts "a". Under this condition the color signals R, G, and B outputted from the color separation circuit 13 are supplied to the matrix circuit 17, after the color signals R, G and B are inverted by the inverting buffer amplifiers 15b. Accordingly, a luminance signal Y, and color-difference signals R - Y and B - Y, which are for a negative image, are generated. In the blue-back circuit 18, the signals Y, R - Y, and B - Y are directly supplied through the contacts "a" to the encoder 19. Accordingly, a video signal Vo for reproducing a negative image is formed. As a result, a negative image mode is set as indicated in the table.

When this switching mode is selected, the image reproduction apparatus reproduces a color negative film of a photograph in the form of a positive image. Accordingly, the viewer can clearly view the photograph.

Switching mode (3)

Figure 3A:
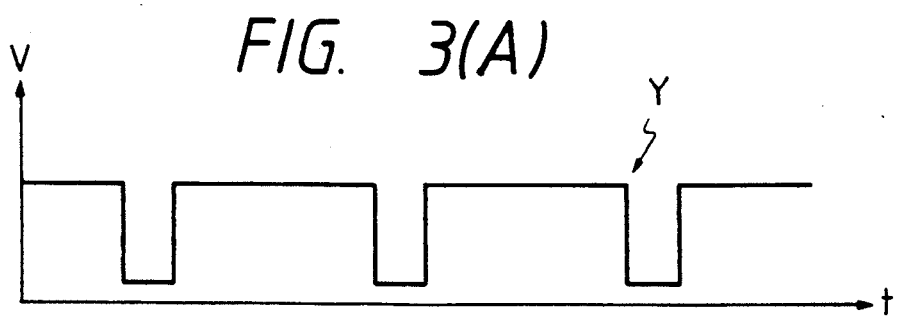
FIG. 3A-3D is a set of waveforms which illustrates the operation of the internal circuit in FIG. 2.
Figure 3B:
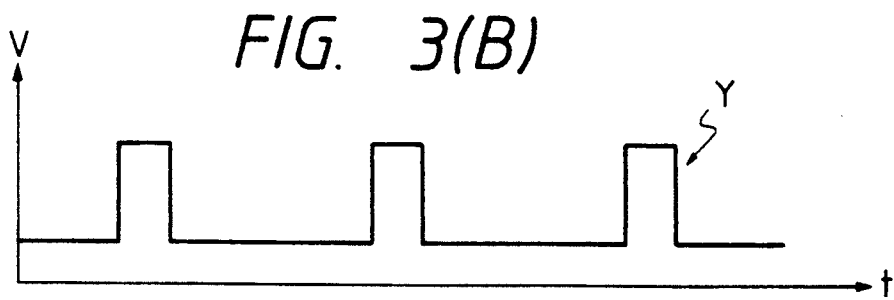
Figure 3C:
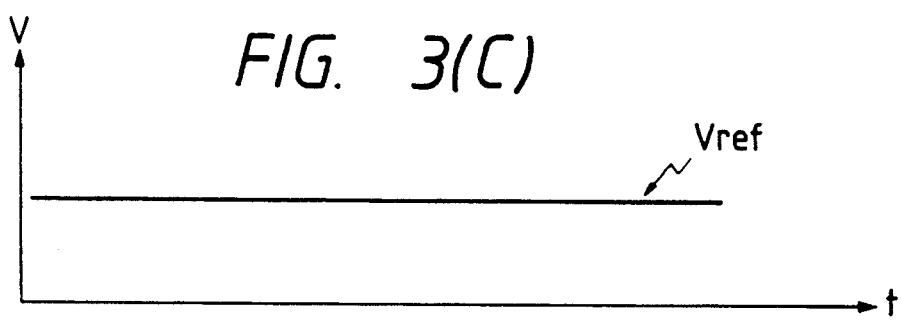

In the switching mode (3) the switches S1 to S3 are turned to contacts "a" and the switches S11 to S13 are turned to contacts "b". Under this condition, the color signals R, G, and B outputted from the color separation circuit 13 are supplied to the matrix circuit 17 through the non-inverting buffer amplifiers 15a without being inverted. Accordingly, a luminance signal Y, and color-difference signals R - Y and B - Y, which are for a negative image, are generated. In the blue-back circuit 18, the switches S11 to S13 are turned to contacts "b". As a result, the luminance signal Y is inverted by the inverting buffer amplifier 20. The color-difference signal R - Y relating to red is shut off, and substituted by a ground voltage. The color-difference signal B - Y relating to blue is shut off, and substituted by a preset voltage Vref. Those color difference signals replaced are supplied to the encoder 19. It is assumed that the luminance signal outputted from the matrix circuit 17 has a waveform as illustrated in FIG. 3(A). Then, the luminance signal outputted from the first select switch S11 takes a phase-inverted waveform as illustrated in FIG. 3(B). The color-difference signal R - Y is not supplied to the encoder 19. The voltage Vref illustrated in FIG. 3(C) in lieu of the color-difference signal B - Y is transferred to the encoder 19.

Figure 3D:
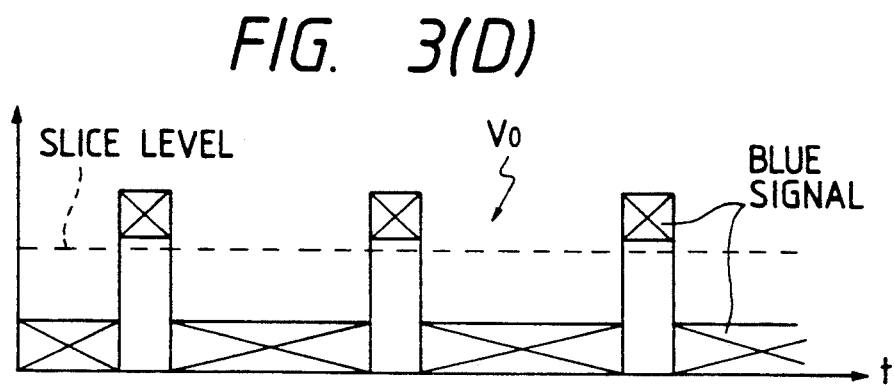

As a result, the encoder 19 forms a video signal Vo in which a blue signal corresponding to the voltage signal Vref is superposed on the luminance signal Y, as illustrated in FIG. 3(D).

When such a video signal Vo is supplied to the image reproduction apparatus such as an ordinary monitor television or an image recording apparatus, a large amplitude signal input limiter slices the high luminous intensity component in excess of a preset slice level. The blue signal component superposed on the high luminous intensity component as well as the high luminous intensity component are removed through the slicing operation. When the video signal thus amplitude limited is reproduced by the monitor television, for example, the high luminous intensity component is reproduced as white, while the low luminous intensity component is reproduced as a blue color or a family color. As a consequence, a blue-back display that is easy to see can be obtained.

In such an object as a document having black characters and graphic figures on a white background, when the switching mode (3) is selected, the portions to be viewed for a close look, e.g., the characters, are reproduced white, while the background is produced blue or a family color. In other words, the switching mode (3) is efficacious for such an object having a high brightness or a high luminous intensity background and a low luminous intensity foreground for being closely looked at.

Switching mode (4)

In the switching mode (4), the switches S1 to S3 are turned to contacts "b" and the switches S11 to S13 are turned to contacts "b". Under this condition, the color signals R, G, and B outputted from the color separation circuit 13 are supplied to the matrix circuit 17, after being inverted by the inverting buffer amplifiers 15b. Accordingly, a luminous signal Y and the color-difference signals R - Y and B - Y, which are for a negative image, are generated. In the blue-back circuit 18, the switches S11 to S13 are turned to contacts "b". As a result, the luminance signal Y is inverted by the inverting buffer amplifier 20. The color-difference signal R - Y relating to red is shut off, and substituted by a ground voltage. The color-difference signal B - Y relating to blue is shut off, and substituted by the preset voltage Vref. The changed color difference signals are supplied to the encoder 19.

As a result, the encoder 19 forms a video signal Vo in which a blue signal corresponding to the voltage signal Vref is superposed on the luminance signal Y.

When the switching mode (4) is selected, the waveforms of the signals are out of phase with respect to the waveforms of the signals illustrated in FIGS. 3(A), (B), and (D).

When such a video signal Vo is supplied to the image reproduction apparatus such as an ordinary monitor television or an image recording apparatus, a large amplitude signal input limiter contained in the apparatus slices the high luminous intensity component in excess of a preset slice level. The blue signal component superposed on the high luminous intensity component as well as the latter is removed through the slicing operation. When the video signal thus amplitude limited is reproduced by the monitor television, for example, the high luminous intensity component is reproduced as white, while the low luminous intensity component is reproduced as a blue color or a family color. As a consequence, the easy-to-see blue-back display can be obtained.

In an object such as a document having white characters and graphic figures on a black background, when the switching mode (4) is selected, the portions to be closely looked at, e.g., the characters, are reproduced white, while the background is reproduced blue or a family color. In other words, the switching mode (4) is efficacious for such an object having a low brightness or a high luminous intensity background and a high luminous intensity foreground for being closely looked at.

In the present embodiment, the white portion in the image is set by the large amplitude signal input limiter, which is contained in the image reproduction apparatus or the image recording apparatus coupled with the image input device as described above. Because of this, the internal circuit is simplified.

Figure 4:
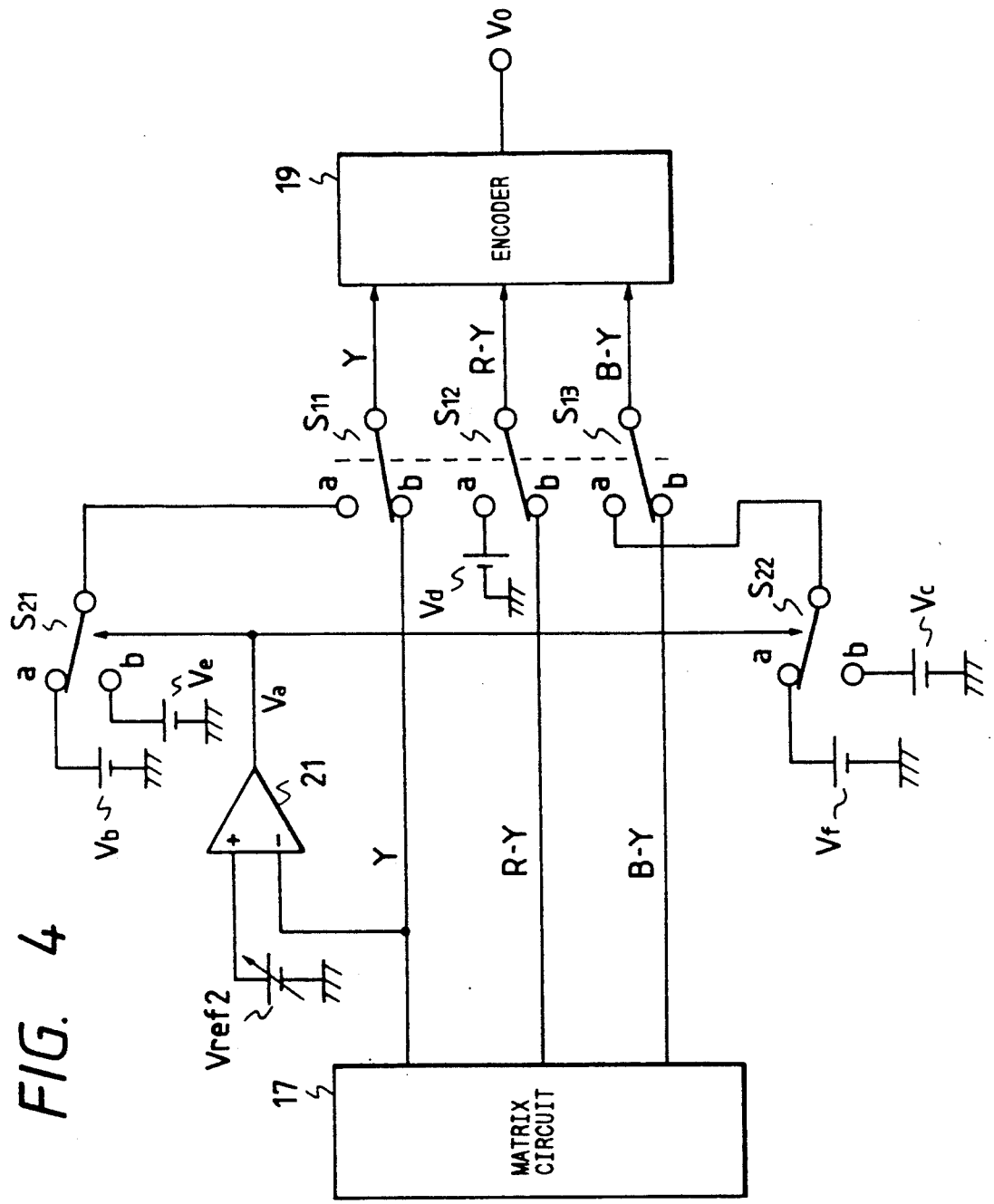
FIG. 4 is a circuit diagram illustrating a second embodiment of the image input device according to the present invention.

A second embodiment of the image input device according to the present invention will be described with reference to FIGS. 4 and 5. In FIG. 4, the same reference symbols are used for designating the same or similar portions as in FIG. 2.

An arrangement of the image input device according to the second embodiment will be described with reference to FIG. 4. A blue-back circuit, which is located between the matrix circuit 17 and the encoder 19, contains a comparator 21 for comparing a voltage level of the luminance signal Y with a preset threshold voltage Vref2. When the luminance signal Y is lower than the preset threshold voltage Vref2, the signal Va is "H" in logic level. When the luminance signal Y is higher than the present threshold voltage Vref2, the signal Va is "L" in logic level.

Figure 2:
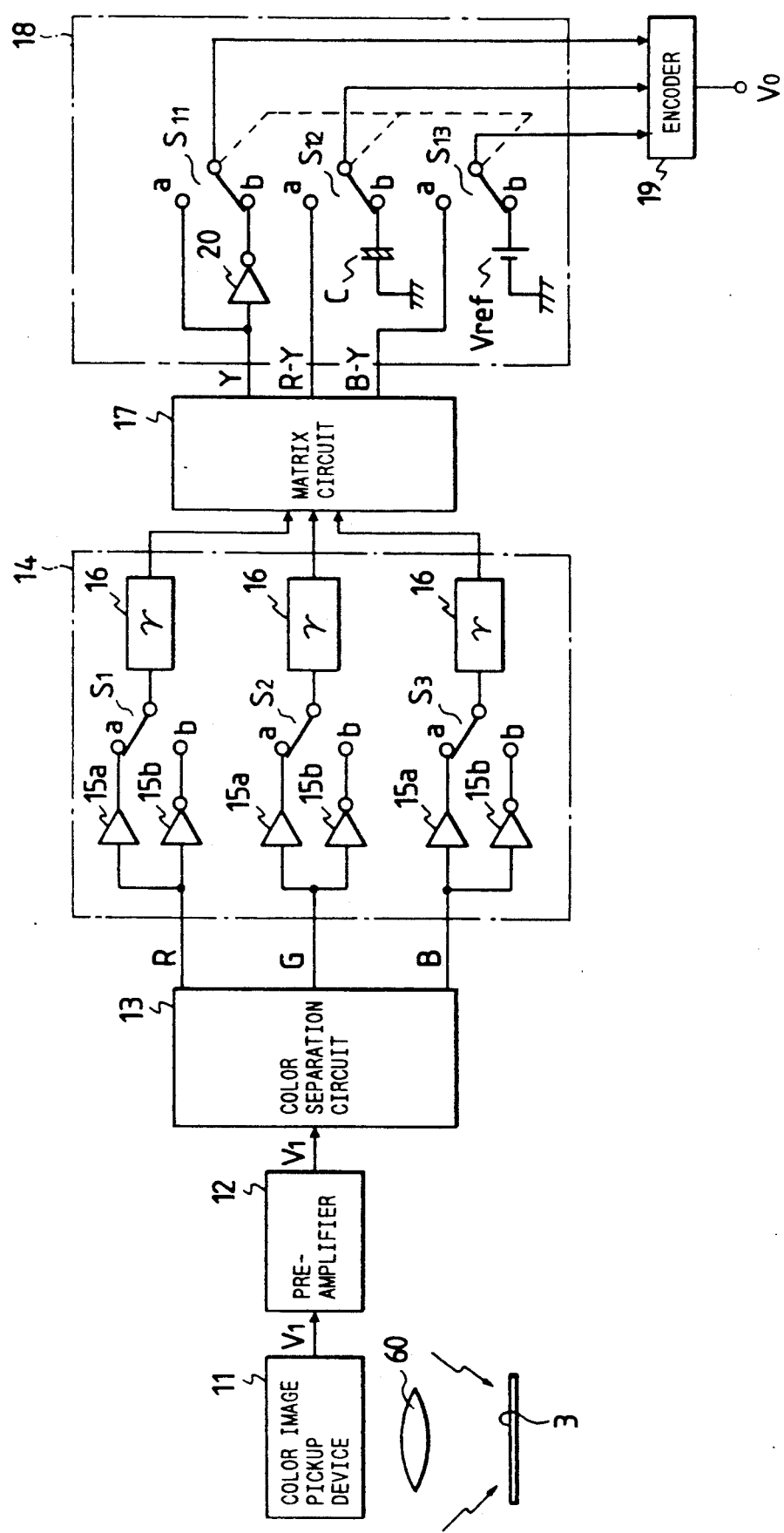
FIG. 2 is a circuit diagram illustrating an internal circuit of the image input device for a first embodiment of the present invention.

The blue-back circuit contains switches S21 and S22, in addition to the group of switches S11 to S13, which correspond to the switches S11 to S13 in FIG. 2. A contact "a" of the switch S21 is coupled with a preset DC voltage Vb, while another contact "b" is coupled with a preset DC voltage Ve. Similarly, a contact "a" of the switch S22 is coupled with a preset DC voltage Vc, while another contact "b" is coupled with a preset DC voltage Vf. The switches S21 and S22 are switched in response to a logic level of the signal Va in an interlocking manner. Specifically, when the signal Va is "H" (the voltage level of the luminance signal is smaller than the threshold voltage Vref2), the switches S21 and S22 are both automatically turned to the contacts "a". When the signal Va is "L" (the voltage level of the luminance signal is higher than the threshold voltage Vref2), the switches S21 and S22 are both automatically turned to the contacts "b".

The switches S11 to S13, and S21 ad S22 are connected as follows. The output contact of the switch S21 is connected to the contact "a" of the first select switch S11. The luminance signal Y is directly supplied to the contact "b" of the first select switch S11. The DC voltage Vd is previously applied to the contact "a" of the second select switch S12, and the color-difference signal R - Y is directly supplied to the contact "b". Further, the output contact of the switch S22 is connected to the contact "a" of the third select switch S13, and the color difference signal B - Y is directly applied to the contact "b".

The process circuit, the camera mechanism, and the like, which are located preceding the matrix circuit 17, are the same as circuit and mechanism in FIG. 2.

The operation of the second embodiment thus arranged will be described with reference to FIG. 5.

A user may operate a mode switch (not shown), which is located outside, to designate a non-blue-back mode. The first to third select switches S11 to S13 are turned to the contact "b", so that the luminance signal Y, and the color difference signals R - Y and B - Y are directly applied to the encoder 19.

When the non-blue-back mode is selected, the instruction of the negative/positive inversion to the process circuit is set to the positive reproduction. Then, the encoder 19 produces a video signal Vo to reproduce an ordinary color image. When the negative reproduction is instructed, the encoder 19 produces a video signal Vo to reproduce a negative color image.

The user may also operate the mode switch (not shown), which is located outside, to designate a blue-back mode. The first to third select switches S11 to S13 are turned to the contact "a", so that the supply of the luminance signal Y, and the color difference signals R - Y and B - Y to the encoder 19, is shut off. The signal from the switch S21 is substituted for the luminance signal, the voltage Vd is substituted for the color-difference signal R - Y and the signal from the switch S22 is substituted for the color-difference signal B - Y. Subsequently, the changed signals are supplied to the encoder 19.

Figure 5A:
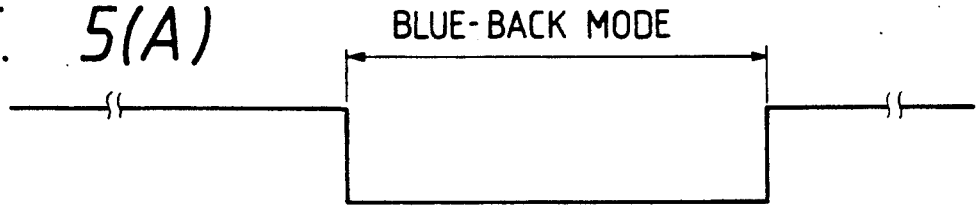
FIG. 5A-5D is a set of waveforms which illustrates the operation of the internal circuit in FIG. 4.
Figure 5B:
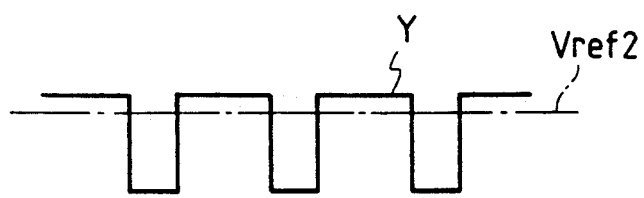
Figure 5C:
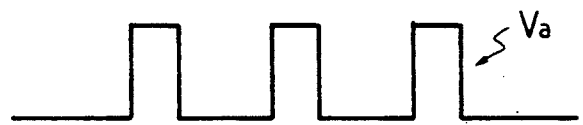

It is assumed that the luminance signal Y outputted from the matrix circuit 17 takes a waveform as illustrated in FIG. 5(B). The comparator 21 compares the preset threshold voltage Vref2 with the luminance signal Y and produces an output signal Va of the waveform as illustrated in FIG. 5(C). When the output signal Va is at a logic level "H", the switches S21 and S22 are turned to the contacts "a". As a result, the Voltage Vb and the voltage vf are supplied to the encoder 19, in place of the luminance signal and in place of the color-difference signal B-Y, respectively. When the output signal Va is at a logic level "L", the switches S21 and S22 are turned to the Contacts "b", so that the voltage Ve and the voltage Vc are supplied to the encoder 19, in place of the luminance signal and the color-difference signal B - Y, respectively.

Figure 5D:
Figure 5E:
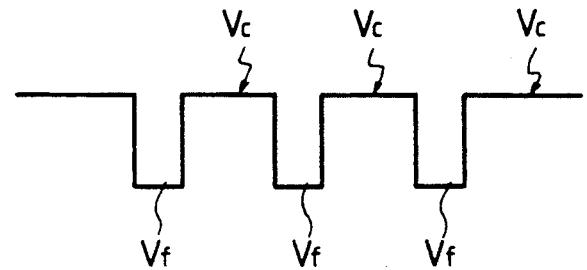

In the present embodiment, Vb > Ve and Vc > Vf so that the voltage substituted for the luminance signal has a waveform as illustrated in FIG. 5(D), and the signal for the color-difference signal B - Y is as illustrated in FIG. 5(E). The voltage Vb is the voltage corresponding to a white level of the reproduced image. The voltage Vc is the voltage corresponding to a level of the blue or a family color of the reproduced image. The voltage Vf is the voltage to inhibit blue from being reproduced in the reproduced image.

As a result, when the blue-back mode is designated, the blue or a family color voltage Vc is forcibly supplied to the encoder 19, for the portion of the image where the luminance signal Y outputted from the matrix circuit 17 is lower than the threshold voltage Vref2. For the high brightness portion of the image, the same voltage Vc is not supplied to the encoder 19. Consequently, the encoder 19 produces a video signal Vo such that the high brightness portion is white and the background is blue or a family color.

In the blue-back mode, if the negative/positive inversion is designated in the process circuit, the blue-back display of the positive image or the negative image can be set up, as described in the first embodiment. Thus, the easy-to-see blue-back display can be set up according to the type of the document being reproduced. The voltage Vd in the second embodiment may be generated by a capacitor as used in the first embodiment.

The switches S11 to S22 are illustrated as mechanical switches, but analog switches constructed with transistors, for example, may preferably be used.

Thus, the image input device of the second embodiment generates the video signal forcibly colored blue, and can produce the blue-back processed video signal without using the amplitude limiter contained in the image reproduction apparatus or the image recording apparatus.

As seen from the foregoing description, according to the embodiment of the invention, the image picked up in color mode can be reproduced in the blue-back mode. As a result, the illegible document can be displayed as a legible document.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image input device, comprising:
   image pickup means for developing a pixel signal of an object as first, second and third color pixel signals;
   pixel signal processing means for passing through said first, second and third color pixel signals unchanged when a normal positive color image display mode or a blue-back display of a negative image mode is selected by an operator and inverting said first, second and third color pixel signals when a negative color image display mode or a blue-back display of a positive image mode is selected by an operator;
   a matrix circuit for developing a luminance signal and first and second color difference signals from said first, second and third color pixel signals outputted by said pixel signal processing means;
   blue-back processing means for passing through said luminance and first and second color difference signals unchanged when said normal positive color image display mode or said negative color image display mode is selected by an operator and inverting said luminance signal, changing said first color difference signal to a ground signal and changing said second color difference signal to a predetermined voltage signal when said blue-back display of a positive image mode is selected by an operator, said blue-back processing means comprises an inverter for inverting said luminance signal, a switch for changing said first color difference signal to said ground signal and a predetermined voltage source for changing said second color difference signal to said predetermined voltage signal in said blue-back display of positive and negative image modes and first, second and third display mode switches for simultaneously switching said luminance and first and second color difference signals between said normal positive color image display mode and said negative color image display mode to said blue-back display of positive and negative image modes; and
   an encoder for developing a video signal from said luminance signal and said first and second color difference signals outputted by said blue-back processing means.

2. An image input device according to claim 5, wherein said image pickup means comprises an optical system for focusing on said object, a color image pickup device for reading out said pixel signal of said object in synchronism with a dot-sequence scanning timing by a predetermined drive and a pre-amplifier for amplifying said pixel signal from said color image pickup device.

3. An image input device according to claim 5, wherein said first color pixel signal comprises a red pixel signal, said second color pixel signal comprises a blue pixel signal and said third color pixel signal comprises a green pixel signal.

4. An image input device according to claim 3, wherein said first color difference signal comprises an R - Y color difference signal and said second color difference signal comprises an B - Y color difference signal.

5. An image input device according to claim 3, wherein said color image pickup device comprises a CCD solid state device.

6. An image input device according to claim 3, wherein said color image pickup device comprises a MOS solid state device.

7. An image input device according to claim 1, wherein said pixel signal processing means comprises first, second and third buffers for passing through said first, second and third color pixel signals respectively when said normal positive color image display mode or said blue-back display of a negative image mode is selected by an operator, first, second and third inverters for inverting said first, second and third color pixel signals respectively when said negative color image display mode or said blue-back display of a positive image mode is selected, first, second and third image reproduction switches for simultaneously switching between said normal positive and negative color image display modes and first, second and third $\gamma$ correcting circuits for performing a $\gamma$ correction on said first, second and third color pixel signals outputted from said first, second and third buffers or said first, second and third inverters respectively in response to said first, second and third image reproduction switches.

8. An image input device, comprising:
   image pickup means for developing a pixel signal of an object;
   color separating means for separating said pixel signal into first, second and third color pixel signals;
   pixel signal processing means for passing through said first, second and third color pixel signals unchanged when a normal positive color image mode or a blue-back display of a negative image mode is selected by an operator and inverting said first, second and third color signals when a negative color image display mode or a blue-back display of a positive image mode is selected by an operator;

a matrix circuit for developing a luminance signal and first and second color difference signals from said first, second and third color pixel signals outputted by said pixel signal processing means;

comparator for comparing said luminance signal with a reference voltage and developing a comparison signal having a high logical value when said reference voltage is greater than said luminance signal and a low logical value when said reference voltage is less than said luminance signal;

blue-back processing means for passing through said luminance signal when said normal positive color image display mode and said negative color image display mode is selected by an operator and changing said luminance signal to a first predetermined voltage level and said second color difference signal to a second predetermined voltage level in response to said comparison signal being said high logical value, changing said luminance signal to a third predetermined voltage level and said second color difference signal to a fourth predetermined voltage level in response to said comparison signal being said low logical value with said first predetermined voltage level being greater than said third predetermined voltage level and said second predetermined voltage level being greater than said fourth predetermined voltage level and changing said first color difference signal to a fifth predetermined voltage level when said blue-back display of a positive image mode or a blue-back display of a negative image mode is selected by an operator; and an encoder for developing a video signal from said luminance signal and said first and second color difference signals outputted by said blue-back processing means.

9. An image input device according to claim 8, wherein said image pickup means comprises an optical system for focusing on said object, a color image pickup device for reading out said pixel signal of said object in synchronism with a dot-sequence scanning timing by a predetermined drive and a pre-amplifier for amplifying said pixel signal from said color image pickup device.

10. An image input device according to claim 8, wherein said first color pixel signal comprises a red pixel signal, said second color pixel signal comprises a blue pixel signal and said third color pixel signal comprises a green pixel signal.

11. An image input device according to claim 10, wherein said first color difference signal comprises an R - Y color difference signal and said second color difference signal comprises an B - Y color difference signal.

12. An image input device according to claim 10, wherein said color image pickup device comprises a CCD solid state device.

13. An image input device according to claim 10, wherein said color image pickup device comprises a MOS solid state device.

14. An image input device according to claim 8, wherein said pixel signal processing means comprises first, second and third buffers for passing through said first, second and third color pixel signals respectively when said normal positive color image display mode or said blue-back display of a positive image mode is selected by an operator, first, second and third inverters for inverting said first, second and third color pixel signals respectively when said negative color image display mode or said blue-back display of a positive image mode is selected, first, second and third image reproduction switches for simultaneously switching between said normal positive and negative color image display modes and first, second and third γ correcting circuits for performing a γ correction on said first, second and third color pixel signals outputted from said first, second and third buffers or said first, second and third inverters respectively in response to said first, second and third image reproduction switches.

15. A method according to claim 14, wherein said first color pixel signal comprises a red pixel signal, said second color pixel signal comprises a blue pixel signal and said third color pixel signal comprises a green pixel signal.

16. A method according to claim 15, wherein said first color difference signal comprises an R - Y color difference signal and said second color difference signal comprises an B - Y color difference signal.

17. An image input device according to claim 8, wherein said blue-back processing means comprises first, second and third display mode switches for simultaneously switching said luminance and first and second color difference signals between said normal positive display color image mode and said negative color image display mode to said blue-back display of positive and negative modes and first and second voltage level switches for simultaneously switching between said first and second predetermined voltage levels and said third and fourth predetermined voltage levels in response to said comparison signal.

18. A method for reproducing negative and positive images of an object, comprising the steps of:
(a) developing a pixel signal of the object by an image pickup device;
(b) separating said pixel signal into first, second and third color pixel signals;
(c) passing said first, second and third color pixel signals unchanged when a positive color image mode is selected by an operator;
(d) inverting said first, second and third color pixel signals when a negative color image mode is selected by an operator;
(e) developing a luminance signal and first and second color difference signals from said first, second and third color pixel signals outputted at said steps (c) and (d);
(f) passing said luminance and first and second color difference signals unchanged when a normal display mode is selected by an operator;
(g) inverting said luminance signal, changing said first color difference signal to a ground signal and changing said second color difference signal to a predetermined voltage signal when a blue-back display mode is selected by an operator; and
(h) developing a video signal from said luminance signal and said first and second color difference signals outputted at said steps (f) and (g).

19. A method according to claim 18, wherein said first color pixel signal comprises a red pixel signal, said second color pixel signal comprises a blue pixel signal and said third color pixel signal comprises a green pixel signal.

20. A method according to claim 19, wherein said first color difference signal comprises an R - Y color difference signal and said second color difference signal comprises an B - Y color difference signal.

21. A method for reproducing negative and positive images of an object, comprising the steps of:

(a) developing a pixel signal of the object by an image pickup device;
(b) separating said pixel signal into first, second and third color pixel signals;
(c) passing said first, second and third color pixel signals unchanged when a positive color image is selected by an operator;
(d) inverting said first, second and third color pixel signals when a negative color image mode is selected by an operator;
(e) developing a luminance signal and first and second color difference signals from said first, second and third color pixel signals outputted at said steps (c) and (d);
(f) comparing said luminance signal with a reference voltage;
(g) developing a comparison signal having a high logical value when said reference voltage is greater than said luminance signal and a low logical value when said reference voltage is less than said luminance signal in response to the comparison at said step (f);
(h) passing said luminance and first and second color difference signals unchanged when a normal display mode is selected by an operator;
(i) changing said luminance signal to a first predetermined voltage level and said second color difference signal to a second predetermined voltage level in response to said comparison signal being said high logical value, changing said luminance signal to a third predetermined voltage level and said second color difference signal to a fourth predetermined voltage in response to said comparison signal being said low logical value with said first predetermined voltage level being greater than said third predetermined voltage level and said second predetermined voltage level being greater than said fourth predetermined voltage level and changing said first color difference signal to a fifth predetermined voltage level when a blue-back display mode is selected by an operator; and
(j) developing a video signal from said luminance signal and said first and second color difference signals outputted at said steps (h) and (i).

* * * * *